United States Patent Office 3,707,532
Patented Dec. 26, 1972

3,707,532
AZO DYESTUFFS CONTAINING A
BENZTHIAZOLYL GROUP
Klaus Artz, Muttenz, and Visvanathan Ramanathan and
Peter Moser, Basel, Switzerland, assignors to Ciba-
Geigy AG, Basel, Switzerland
No Drawing. Filed Dec. 23, 1969, Ser. No. 887,727
Claims priority, application Switzerland, Jan. 3, 1969,
11/69; June 11, 1969, 8,897/69
Int. Cl. C09b 31/04
U.S. Cl. 260—158                                3 Claims

ABSTRACT OF THE DISCLOSURE

Azo dyestuffs that are free from acidic groups imparting solubility in water and that correspond to the formula

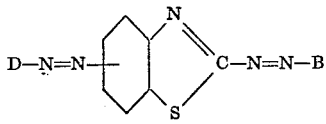

in which D represents a benzene residue that may be substituted or the residue of a coupling component, and B represents the residue of a coupling component free from acidic groups imparting solubility in water.

---

This invention provides new and valuable disazo dyestuffs that are free from acidic groups imparting solubility in water and that correspond to the formula

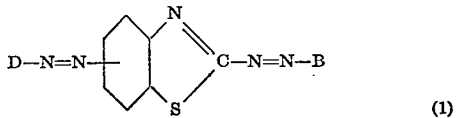

(1)

in which D represents a benzene residue that may be substituted or the residue of a coupling component and B represents the residue of a coupling component that is free from acidic groups imparting solubility in water.

The preferred dyestuffs are those of the formula

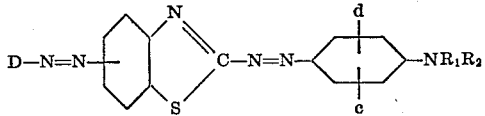

in which D has the meaning given above, $d$ represents a hydrogen or a halogen atom, a low-molecular alkyl, alkoxy or mercapto group, an aryl, arylmercapto or aryloxy group or a cycloalkyl, cycloalkylmethyl or benzyl group, $c$ represents the same or an acylamino residue and $R_1$ and $R_2$ each represents a hydrogen atom or an alkyl residue that may be substituted.

Special mention may be made of the dyestuffs of the formula

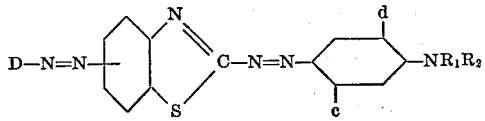

in which D, $c$, $d$, $R_1$ and $R_2$ have the meanings given above. The residues $c$ and $d$ each represent a hydrogen atom or a methyl, ethyl, methoxy, ethoxy, phenylthio or phenoxy residue.

In addition to the groups specified above, the group $c$ can also represent a chlorine or a bromine atom, a trifluoromethyl group, an alkylsulphonyl group, preferably a methylsulphonyl group, or an acylamino group that may be alkylated, preferably methylated, at the nitrogen atom and in which the acyl residue is the residue of an organic monocarboxylic acid, the residue of an organic monosulphonic acid, for example, methane-, ethane- or para-toluenemonosulphonic acid or the residue of a carbamic acid ester or a carbonic acid monoester or monamide, for example, phenoxycarbonyl, methoxycarbonyl and aminocarbonyl.

The groups $R_1$ and $R_2$ can be hydrogen atoms or low alkyl groups, that is to say, alkyl groups containing 1 to 4, preferably 2 to 4, carbon atoms, for example, methyl, ethyl, n-propyl or n-butyl groups that can be substituted in the usual manner, for example, benzyl or β-phenethyl groups; halogenated alkyl groups, for example, β-chloroethyl, β,β,β-trifluoroethyl, β,γ-dichloropropyl or β-cyanoethyl groups; alkoxyalkyl groups, for example, β-ethoxyethyl or δ-methoxybutyl groups; hydroxyalkyl groups, for example, β-hydroxyethyl or β,γ-dihydroxypropyl groups; nitroalkyl groups, for example, β-nitroethyl groups; carbalkoxy groups, for example, β-carbo(methoxy-, ethoxy- or propoxy)-ethyl groups (it being possible for the terminal alkyl group to carry a cyano, cabalkoxy, acyloxy or amino group in ω-position) or β- or γ-carbo(methoxy- or ethoxy)-propyl groups; acylaminoalkyl groups, for example, β-(acetyl- or formyl)-aminoethyl groups; acyloxyalkyl groups, for example, β-acetyloxyethyl or β,γ-diacetoxypropyl groups; β-(alkyl- or aryl)-sulphonylalkyl groups, for example, β-methanesulphonylethyl, β-ethanesulphonylethyl or β-(para-chlorobenzenesulphonyl)-ethyl groups; alkyl- or arylcarbamoyloxyalkyl groups, for example, β-methylcarbamyloxyethyl and β-phenylcarbamyloxyethyl groups; alkoxycarbonyloxyalkyl groups, for example, β-(methoxy-, ethoxy- or isopropyloxy)-carbonyloxyethyl, γ-acetamidopropyl, β - (para - nitrophenoxy)-ethyl, β-(para-hydroxyphenoxy)-ethyl, β-(β'-acetylethoxycarbonyl)-ethyl, β-[(β'cyano-, hydroxy-, methoxy- or acetoxy) - ethoxycarbonyl] - ethyl, cyanoalkoxyalkyl, β-carboxyethyl, β-acetylethyl-, γ-aminopropyl-, β-diethylaminoethyl-, β-cyanoacetoxyethyl- and β-benzoyl-β-(paraalkoxy- or phenoxy-benzoyl)-oxyethyl groups.

The groups $R_1$ and $R_2$ generally contain not more than 18 carbon atoms.

The new dyestuffs may be obtained (1) by diazotizing an azobenzthiazolyl-2-amine of the formula

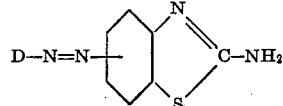

in which D represents the residue of a substituted benzene or the residue of a coupling component, and then coupling it with a coupling component H—B, or (2) coupling an azobenzthiazolyl-2-hydrazine of the formula

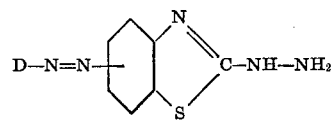

oxidatively with a coupling component H—B, or (3) coupling an azobenzthiazolone-2-hydrazone of the formula

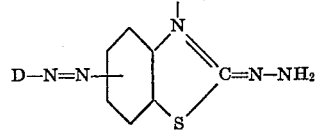

with a coupling component to form a quaternated azo dyestuff, or (4) diazotizing an acylaminobenzthiazolyl-2-amine of the formula

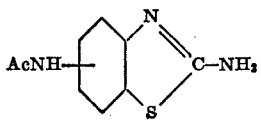

in which Ac represents an acyl residue, especially an acetyl residue, coupling the diazo compound with a coupling component H—B, hydrolysing the acylamino group situated on the benzene ring, diazotizing the primary amino group and then coupling the resulting diazonium compound with a coupling component H—D, and (5) if desired or required, treating the dyestuffs obtained, if they contain quaternatable nitrogen atoms, with alkylating agents, it being essential that the reactants used in the reaction steps (1) to (5) be free from acidic substituents imparting solubility in water.

The 6-phenylazobenzthiazolyl-2-amines may be obtained in a manner known per se in that a para-aminoazobenzene is thiocyanated in ortho-position to the amino group and then condensed to form benzthiazolyl-2-amine.

The para-aminoazobenzenes may be obtained, for example, by coupling diazotized diazo components of the benzene series with aniline. Furthermore, 5- or 6-azobenzthiazolyl-2-amines can also be obtained by selectively diazotizing 2,5- or 2,6-diaminobenzthiazole at the 5- or 6-amino group with hydrochloric acid and an alkali metal nitrite and coupling with any desired coupling component. The 2-amino group on the 5- or 6-azobenzthiazolyl-2-amine can subsequently be diazotized with nitrosylsulphuric acid.

When coupling components are reacted with diazotized 2-aminoacylaminobenzthiazoles, especially acetylaminobenzthiazole-2-amines, for example, 2-amino-5- or -6-acetylaminobenzthiazole, the acyl group must subsequently be split off from the amino group, and the corresponding aminobenzthiazolyl-2-azo dyestuffs are obtained which are then diazotized and can be coupled with the coupling components.

The preparation of 2-chlorothiazolylazo dyestuffs is described in Swiss patent specification No. 429,897. Amination of the 2-chlorine atom is easily achieved by the action of ammonia in an organic solvent.

The following compounds are examples of suitable diazo components having a benzthiazole residue:

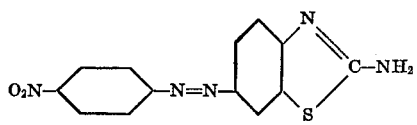

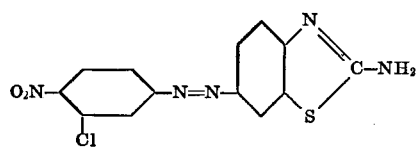

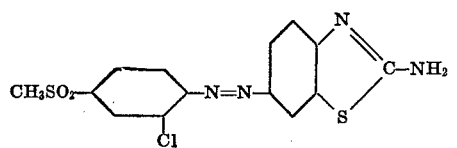

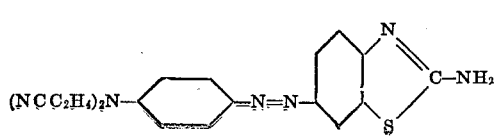

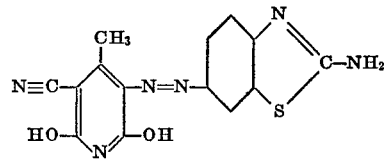

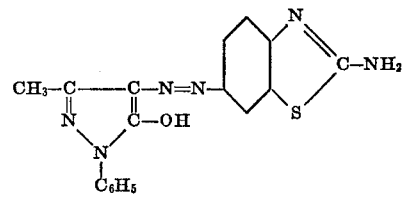

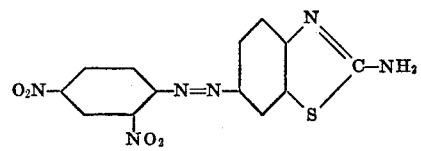

The aminoazo components

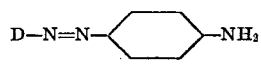

which, by subsequent thiocyanation and a ring-closure reaction, lead to the diazo components of the formula

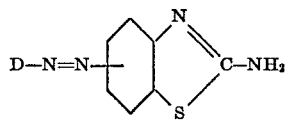

can be derived from the following diazo components D—NH₂:

aminobenzene,
1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-4-cyanobenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-nitrobenzene,
1-amino-2-chloro-4-cyanobenzene,
1-amino-2-chloro-4-nitrobenzene,
1-amino-2-bromo-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2,4-dinitro-6-methylsulphonylbenzene,
1-amino-2,4-dinitro-6-(2'-hydroxyethylsulphonyl) benzene,
1-amino-2,4-dinitro-6-(2'-chloroethylsulphonyl) benzene,
1-amino-2-methylsulphonyl-4-nitrobenzene,
1-amino-2-methylsulphinyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
4-aminobenzoic acid-cyclohexylester,
1-amino-2,4-dinitro-6-chlorobenzene and especially 1-amino-2-cyano-4-nitrobenzene;
also 1-aminobenzene-2-, -3- or -4-sulphonic acid amides, for example, N-methyl- or N,N-dimethyl- or -diethylamide,
N,γ-isopropyloxypropyl-2-aminonaphthalene-6-sulphonic acid amide,
N,γ-isopropyloxypropyl-1-aminobenzene-2-, -3- or -4-sulphonic acid amide,
N-isopropyl-1-aminobenzene-2-, -3- or -4-sulphonic acid amide,
N,γ-methoxypropyl-1-aminobenzene-2-, -3- or -4-sulphonic acid amide,
N,N-bis(β-hydroxyethyl)-1-aminobenzene-2-, -3- or -4-sulphonic acid amide,
1-amino-4-chlorobenzene-2-sulphonic acid amide, and the N-substituted derivatives 2-, 3- or 4-aminophenylsulphamate,
2-amino-4, -5- or -6-methylsulphamate,
2-amino-5-methoxyphenylsulphamate,
3-amino-6-chlorophenylsulphamate,
3-amino-2,6-dichlorophenylsulphamate,
4-amino-2- or -3-methoxyphenylsulphamate,
N,N-dimethyl-2-aminophenylsulphamate,
N,N-di-n-butyl-2-aminophenylsulphamate,
N,N-dimethyl-2-amino-4-chlorophenylsulphamate,
N,n-propyl-3-aminophenylsulphamate,
N,N-di-n-butyl-3-aminophenylsulphamate,
O(3-aminophenyl)-N-morpholine-N-sulphonate,
O(3-aminophenyl)-N-piperidine-sulphonate,
N-cyclohexyl-O-(3-aminophenyl)-sulphamate,
N(N-methylaniline)-O-(3-aminophenyl)sulphonate,
N,N-diethyl-3-amino-6-methylphenylsulphamate,
N-ethyleneimine-O-(4-aminophenyl)-sulphonate,
N,N-dimethyl-4-aminophenylsulphamate,
O-(n-propyl)-O-(3-aminophenyl)sulphonate,
O,β-chloroethyl-O-(2-aminophenyl)sulphonate,
O-benzyl-O-(3-aminophenyl)sulphonate and
O-ethyl-O-(4-amino-2,6-dimethylphenyl)sulphonate.

The following are examples of 4-aminoazobenzenes that can be thiocyanated and cyclized to form diazo components:

4-aminoazo-benzene,
3,2′-dimethyl-4-aminoazobenzene,
2-methyl-5-methoxy-4-aminoazobenzene,
4-amino-2-nitroazobenzene,
2,5-dimethoxy-4-aminoazobenzene,
4′-methoxy-4-aminoazobenzene,
2-methyl-4′-methoxy-4-aminoazobenzene,
3,6,4′-trimethoxy-4-aminoazobenzene,
4′-chloro-4-aminoazobenzene,
2′- or 3′-chloro-4-aminoazobenzene,
3-nitro-4-amino-2′,4′-dichloroazobenzene and
4-aminoazobenzene-4′-sulphonic acid amide.

Instead of the ionic diazo components free from groups imparting solubility in water that are specified above, there may also be used those that contain fibre-reactive groups, for example, s-triazinyl residues carrying 1 or 2 chlorine or bromine atoms on the triazine ring, pyrimidyl residues carrying one or two chlorine atoms or one or two arylsulphonyl or alkanesulphonyl groups on the pyrimidine ring, mono- or bis-(γ-halogeno-β-hydroxypropyl)-amino groups, β-halogeno-ethylsulphamyl residues, β-halogeno-ethoxy groups, β-halogeno-ethylmercapto groups, 2-chlorobenzthiazolyl-6-azo groups, 2-chlorobenzthiazolyl-6-amino groups, γ-halogeno-β-hydroxypropyl-sulphamyl residues, chloroacetylamino groups, α,β-dibromopropionyl groups, vinylsulphonyl groups and 2,3-epoxypropyl groups.

The following are given as examples of suitable fibre-reactive diazo components:

N,β-chloroethyl-3-chloro-4-aminobenzene-sulphamide (hydrochloride),
N,β-chloroethyl-4-aminobenzene-sulphamide (hydrochloride),
3-bromo-4-amino-ω-chloroacetophenone,
N,γ-chloro-β-hydroxypropyl-4-aminobenzene-sulphamide,
N,β-chloroethyl-1-amino-4-naphthylsulphonamide,
N,β-chloroethyl-1-amino-3,5-dichlorobenzene-sulphamide and
4-(γ-chloro-β-hydroxypropoxy)-aniline.

Coupling components of all kinds can be used in the manufacture of the azo dyestuffs, for example, those belonging to the benzene or naphthalene series or to the series of heterocyclic coupling components. In addition to the phenols, for example, meta- or para-cresol, resorcinol and 1-hydroxy-3-cyanomethylbenzene, coupling components of the benzene series that may be specially mentioned are the aminobenzenes, for example, aniline, 3-methylaniline, 2-methoxy-5-methylaniline, 3-acetylamino-1-aminobenzene, N-methylaniline, N-β-hydroxyethylaniline, N - β - methoxyethylaniline, N - β - cyanoethylaniline, N - β - chloroethylaniline, dimethylaniline, diethylaniline, N - methyl - N - (benzyl- or β-phenylethyl)-aniline, N-n-butyl-N-β-chloroethylaniline, N-(methyl-, ethyl-, propyl- or butyl)-N-β-cyanoethylaniline, N-methyl-N-β-hydroxyethylaniline, N-ethyl-N-β-chloroethylaniline, N-methyl-N-β-acetoxyethylaniline, N-ethyl-N-β-methoxyethylaniline, N-β-cyanoethyl-N-β-chloroethylaniline, N-cyanoethyl-N-(acetoxy- or benzoyloxyethyl) aniline, N,N-di-α-hydroxyethylaniline, N,N-di-β-acetoxyethylaniline, N-ethyl-N-2-hydroxy-3-chloropropylaniline, N,N-di-β-cyanoethylaniline, N,N-di-β-cyanoethyl-3-methylaniline, N-β′-cyanoethyl-N-β′′-hydroxyethyl-3-chloroaniline, N,N-di-β-cyanoethyl-3-methoxyaniline, N,N-dimethyl-3-acetylaminoaniline, N-ethyl-N-β-cyanoethyl-3-acetylaminoaniline, N,N-di-β - cyanoethyl-2-methoxy-5-acetylaminoaniline, N-methyl-N-phenacylaniline, N-β-cyanoethyl-2-chloronaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and also, for example, amines of the formula

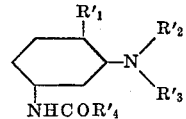

in which R′₁ represents a hydrogen atom or an alkyl or alkoxy group, R′₂ represents a cyanoalkoxyalkyl group, R′₃ represents a hydrogen atom, a cyanoalkoxyalkyl group or an acyloxyalkyl group and R′₄ represents a hydrogen atom, an alkyl, cycloalkyl or alkoxy group that may be substituted or a benzene residue, and especially those of the formula

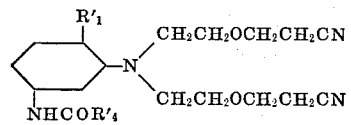

in which R′₁ and R′₄ have the meanings given above.

Valuable results may also be obtained with coupling components of the formulae

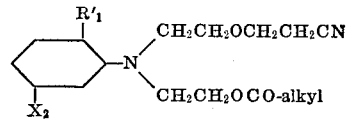

and

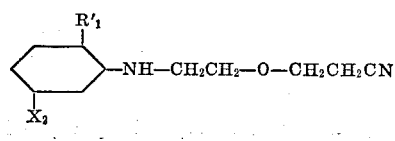

in which $R'_1$ has the meaning given above, $X_2$ represents an acylamino group and "alkyl" represents, for example, a methyl, ethyl or propyl group.

The following coupling components are given as examples:

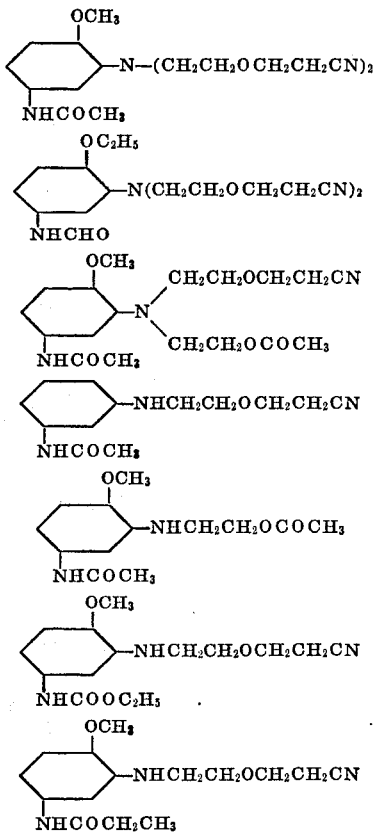

The following are mentioned as examples of coupling components of the naphthalene series, especially naphthols and aminonaphthalenes:

α-naphthol, β-naphthol,
4-methoxy-1-hydroxynaphthalene,
2-hydroxy-8-methylsulphonylaminonaphthalene,
2-hydroxynaphthalene-3-carboxylic acid anilide,
2-hydroxy-8-acetylaminonaphthalene,
1-hydroxynaphthalene-3-sulphone-methylene-ether-4,
2-hydroxynaphthalene-6-sulphonamide,
2-hydroxynaphthalene-6-sulphonic acid dimethylamide,
1-hydroxy-5,8-dichloronaphthalene,
N,β-dimethylaminoethyl-2-hydroxynaphthalene-3-carboxylic acid amide,
1- or 2-naphthylamine,
2-phenylaminonaphthalene,
1-dimethylaminonaphthalene or
2-ethylaminonaphthalene.

Heterocyclic coupling components are, for example, indoles having acid hydrogen atoms, for example, 2-methylindole, 2,5 - dimethylindole, 2,4 - dimethyl - 7 - methoxyindole, 2-phenyl- or 2 - methyl - 5 - ethoxyindole, N,β-cyanoethyl - 2 - methylindole, 2-methyl-5- or -6-chloroindole, 1,2-dimethylindole, 1 - methyl - 2 - phenylindole, 2 - methyl - 5 - nitroindole, 2 - methyl - 5 - cyanoindole, 2 - methyl - 7 - chloroindole, 2 - methyl - 5 - fluoro- or -5-bromoindole, 2 - methyl - 5,7 - dichloroindole or 2-phenylindole and 1 - cyanoethyl - 2,6 - dimethylindole. The indole may be further described as substituted indole wherein the substituent is selected from the group consisting of methyl, phenyl methoxy, ethoxy, β-cyanoethyl, chloro, nitro, cyano, fluoro and bromo; pyridines, for example, 3 - cyano - 2,6 - dihydroxy - 4 - methylpyridine; pyrazoles, for example, 1 - phenyl - 5 - amino-pyrazole or 3 - methylpyrazolone - 5 or 1 - phenyl - 3-methylpyrazolone - 5, 1,3 - dimethylpyrazolone - 5, 1-butyl - 3 - methylpyrazolone - 5, 1 - hydroxyethyl - 3-methylpyrazolone-5, 1 - cyanoethyl - 3 - methylpyrazolone-5, 1 - (ortho - chlorophenyl) - 3 - methylpyrazolone-5 and 3 - carbomethoxypyrazolone - 5. The pyrazolones may be further described as substituted pyrazolones wherein the substituent is selected from the group consisting of phenyl, $C_{1-4}$ alkyl, hydroxyethyl, cyanoethyl, chlorophenyl and carbomethoxy; quinolines, for example, 8 - hydroxyquinoline, 1 - methyl - 4 - hydroxyquinoline - 2 and N - ethyl - 3 - hydroxy - 7 - methyl - 1,2,3,4 - tetrahydroquinone or pyrimidines, for example, barbituric acid, and also 1,3-indandione, 1,8-naphthindandione, dimedone, acetoacetic acid anilide, meta-hydroxy-N,N-diethylaniline, 3-hydroxy-4'-methyldiphenylamine, hydroquinone-monomethyl ether, acetylacetone, 5 - hydroxybenzthiazole and 1,2 - diphenylpyrazolidine - 3,5 - dione, and, finally, coupling components of the aniline series, for example, 1,2,3,4 - tetrahydroquinolines (known as tetrahydroquonolines) and benzomorpholines, for example, tetrahydroquinoline, N,β-cyanoethyl- or N - β - hydroxyethyl - tetrahydroquinoline, N - β,γ - dihydroxypropyl-tetrahydroquinoline, N - β,γ - dihydroxypropyl - 7 - methoxy - tetrahydroquinoline, N - β,γ - dihydroxypropyl-5 - acetylamino - tetrahydroquinoline, N - β - hydroxyethyl - 2,2,4 - trimethyl - tetrahydroquinoline, N-β-hydroxyethylbenzomorpholine and N - β,γ - dihydroxypropyl-5-acetylaminobenzomorpholine.

Further coupling components of the aniline series that may be mentioned are those containing a quaternatable or quaternated group, for example, N-methyl-N,2-dimethylaminoethylaniline, N,2-(N'-ethyl - N' - phenyl)-aminoethylpyridinium chloride and also, for example, compounds of the formulae

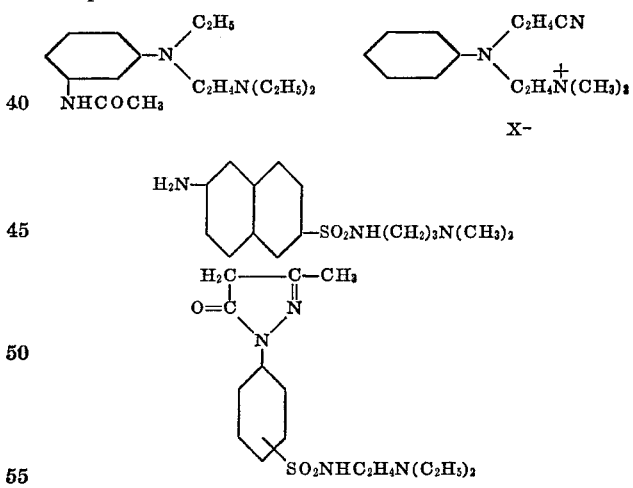

Diazotizable amines can also be mentioned as coupling components of the aniline series, fore example, 1-amino-3-methylbenzene, 1 - amino - 2 - methoxy - 5 - methylbenzene, 1-aminonaphthalene, and so forth; when used, aminoazo dyestuffs are formed that can be diazotized and then coupled with the coupling components specified above to form disazo or polyazo dyestuffs.

Finally, there may also be mentioned coupling components having acid hydrogen atoms, for example, malodinitrile, phenylsulphonylacetonitrile, cyanoacetic acid methyl ester, cyanoacetic acid ethyl ester, cyanoacetic acid butyl ester, 4,5-dimethyl- and 4,5-diphenyl-imidazole.

Diazotization of the diazo components specified can be carried out, for example, with a mineral acid and sodium nitrite or, for example, with a solution of nitrosylsulphuric acid in concentrated sulphuric acid, according to the position of the amino group concerned.

Coupling can also be carried by a method known per se, for example, in a neutral to acid medium, if necessary, in the presence of sodium acetate or a similar buffer that influences the rate of coupling, or a catalyst, for example, dimethylformamide, pyridine or a salt thereof.

Coupling may also be effected with advantage by combining the components in a mixing nozzle. By this is meant a device in which the liquids to be mixed are combined in a comparatively small space, at least one of the liquids being conducted through a nozzle, preferably under pressure. The mixing nozzle can be constructed on the principle of a water-jet pump, and function in like manner, the delivery of one of the liquids in the mixing nozzle corresponding to the delivery of water in a water-jet pump, and the delivery of the other liquid into the mixing nozzle corresponding to the compound in the container of the water-jet pump to be evacuated. The latter delivery of liquid can also be effected under pressure.

However, other devices can also be used to effect speedy and, optionally, continuous mixing in a small space.

The term "coupling" as used herein also includes the so-called oxidative coupling in which the diazonium compound of the diazo component is replaced by a corresponding hydrazine or hydrazone. By the process of oxidative coupling it is possible to obtain the quaternated compounds in one step, in this case, the benzthiazolium compounds.

The following model of a monoazo dyestuff illustrates how coupling and simultaneous quaternation take place:

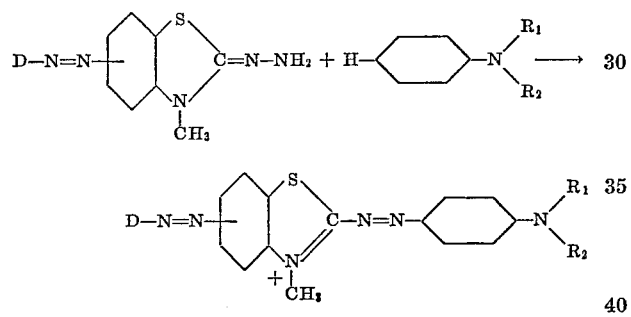

Suitable dehydrogenating or oxidizing agents are, for example, atmospheric oxygen, hydrogen peroxide, hypochlorites, persulphates, perborates, iron(III) salts, copper (III) salts, mercury(II) salts, lead(IV) salts and cerium (IV) salts and hexacyanoferrates(III); if necessary, oxygen carriers may also be used concomitantly, for example, heavy metals and the salts thereof.

The hydrazones can be prepared according to known methods [R. Riemschneider and S. Georgi, Monatshelfte für Chemie, Vol. 91, 623 (1960); S. Hünig et al., Angewandte Chemie, vol. 70, 215 (1958); vol. 74, 818 (1962); vol. 80, 343 (1968); Chimia, vol. 15, 133 (1961); H. Baumann and H. Dehnert, Chimia, vol. 15, 163 (1961)].

The dyestuffs can be quaternated by virtue of the nitrogen atom in the benzthiazole ring and/or if the residues D and/or B contain quaternatable nitrogen atoms, quaternation preferably being carried out as the last step.

Quaternatable dyestuffs of the kind mentioned correspond, for example, to the General Formula 1 and fall into the following categories:

(1) only the benzthiazole residue is quaternatable,
(2) the residue D or the residue B is quaternatable in addition to the benzthiazole residue,
(3) the two residues D and B are quaternatable in addition to the benzthiazole residue. The residues B and/or D in this case may correspond to the following formulae:

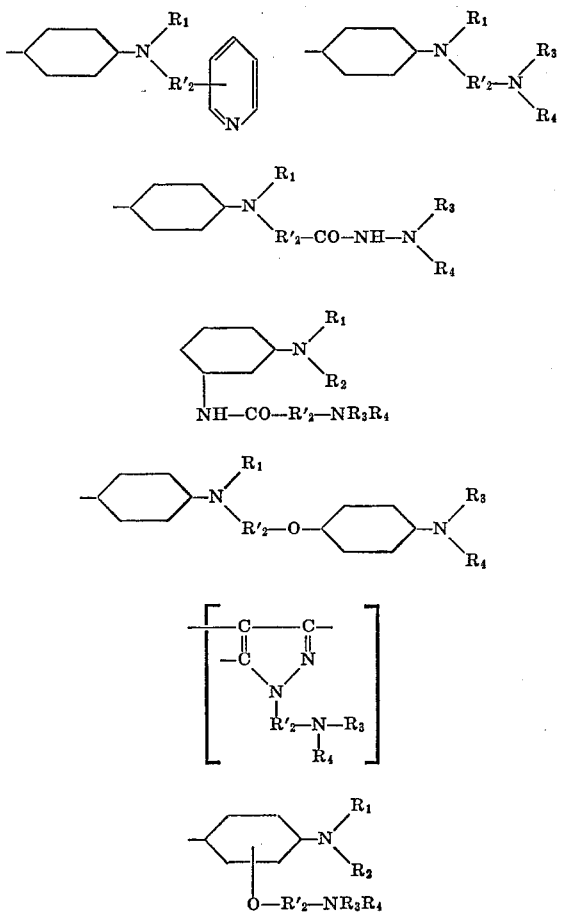

in which $R_3$ and $R_4$ each represents an alkyl group that may be substituted, $R'_2$ represents an alkylene group that may be substituted, for example, a methylene, ethylene-1,2, propylene-1,3 or 2-acetoxypropylene-1,3 group, and $R_1$ and $R_2$ have the meanings given above.

The residue D can also correspond to the formula

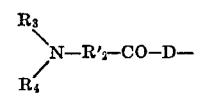

in which D' represents a phenylene residue that may be substituted.

Dyestuffs that are specially preferred are those corresponding to the formulae

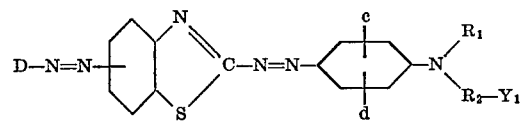

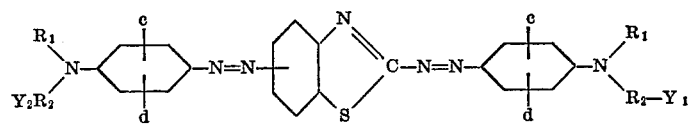

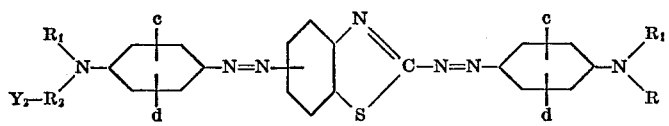

in which $Y_1$ and $Y_2$ each represents a pyridium or trialkylammonium group, for example, a dimethylbenzylammonium group.

Quaternation is effected by a treatment with esters of strong mineral acids or organic sulphonic acids, for example, dimethyl sulphate and diethyl sulphate, alkylhalides, for example, methyl chloride, methyl bromide or methyl iodide, aralkylhalides, for example, benzyl chloride, esters of low-molecular-weight alkane-sulphonic acids, for example, the methyl ester of methane-, ethane- or butane-sulphonic acid and the alkyl esters of (4-methyl-, 4-chloro- or 3- or 4-nitro)-benzenesulphonic acid which form as anions halogen, sulphuric acid semi-ester, alkane or benzenesulphonic acid anions, preferably with heating in an inert organic solvent, for example, xylene, carbon tetrachloride, ortho-dichlorobenzene or nitrobenzene. However, other solvents may also be used, for example, acetic anhydride, dimethylformamide, acetonitrile or dimethyl sulphoxide. The quaternated dyestuffs preferably contain as anion $Y^-$ the residue of a strong acid, for example, the residue of sulphuric acid or semi-esters thereof, or a halide ion; however, they can also be used as double salts, for example, with zinc chloride, or as free bases.

The new water-insoluble dyestuffs, mixtures thereof and mixtures of these dyestuffs with other azo dyestuffs are eminently suitable for dyeing and printing leather, wool, silk and, in particular, synthetic fibres, for example, acrylic and acrylonitrile fibres, polyacrylonitrile fibres and copolymers of acrylonitrile and other vinyl compounds, for example, acrylic esters, acrylic amides, vinylpyridine, vinyl chloride or vinylidene chloride, copolymers of dicyanoethylene and vinyl acetate and of acrylonitrile block copolymers, fibres made of polyurethanes, unmodified polyolefins, polyolefins modified with metals, for example, aluminium, cobalt, copper, vanadium, chromium, zinc and, in particular, nickel, or basified polyolefins, for example, polypropylene, cellulose triacetate and secondary acetate, and, in particular, fibres made of polyamides, for example, nylon 6, nylon 6.6 or nylon 12, and of aromatic polyesters, for example polyesters made from terephthalic acid and ethylene glycol or 1,4-dimethylcyclohexane, and copolymers of terephthalic and isophthalic acid and ethylene glycol.

This invention therefore also relates to a process for dyeing or printing textile materials based on synthetic fibres, especially polyester fibres, or, when the dyestuffs are quaternated, acrylic fibres, wherein there are used dyestuffs of the formula

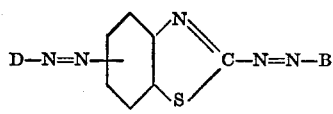

that are free from groups imparting solubility in water, in which formula D represents a benzene residue that may be substituted or the residue of a coupling component and B represents the residue of a coupling component that is free from acidic groups imparting solubility in water.

When dyeing is carried out in an aqueous liquor, the water-insoluble dyestuffs are advantageously used in a finely divided form and dyeing is carried out in the presence of a dispersing agent, for example, sulphite cellulose waste liquor, or a synthetic detergent, or a combination of different wetting and dispersing agents. Prior to dyeing, it is generally advantageous to convert the dyestuff into a dyeing preparation that contains a dispersing agent and the finely divided dyestuff in a form such that a fine dispersion is formed when the preparation is diluted with water. Such dyestuff preparations may be obtained in known manner, for example, by grinding the dyestuff in a highly efficient grinding device in the dry or wet state in the presence or absence of a dispersing agent.

To obtain stronger dyeings on polyethylene terephthalate fibres it is advantageous to add a swelling agent to the dyebath, or to carry out the dyeing process under superatmospheric pressure at a temperature of above 100° C., for example, at 120° C. Suitable swelling agents are aromatic carboxylic acids, for example, salicylic acid, phenols, for example, ortho- or para-hydroxydiphenyl, aromatic halogenated compounds, for example, ortho-dichlorobenzene or diphenyl.

To fix the dyestuff, the padded polyester fabric is heated to a temperature above 100° C., for example, to a temperature between 180 and 210° C., preferably after drying, for example, in a current of warm air.

The dyeings obtained in accordance with this process can be subjected to an aftertreatment, for example, by heating with an aqueous solution of a non-ionic detergent.

The dyestuffs may also be applied by printing processes. In this method of application a printing paste, for example, is used which contains the finely divided dyestuff as well as the adjuvants normally used in printing, for example, wetting and thickening agents.

The process yields strong dyeings and prints possessing good properties of fastness.

The dyestuffs of the invention are also specially suitable for dyeing and printing polypropylene fibers modified with nickel, the dyestuffs used preferably being those that contain, in ortho-position to the azo group, groups of atoms capable of forming complexes, for example, hydroxy, carboxyl, carbalkoxy and alkoxy groups.

Dyestuffs that are specially suitable for dyeing polypropylene modified with nickel are those of the formula

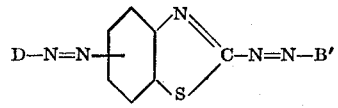

in which D has the meaning given above and B' represents a coupling component containing in ortho-position to the azo group a group capable of forming a complex.

The new water-insoluble dyestuffs can also be used in the spin-coloration of polyamides, polyesters and polyolefins. The polymer to be coloured is advantageously mixed with the dyestuff in the form of a powder, grains or chips, in the form of a solution ready for spinning or in the form of a melt, the dyestuff being in the dry state or in the form of a dispersion or solution in a solvent that may be volatile. After the dyestuff has been homogeneously dispersed in the polymer solution or melt, the mixture is processed in known manner into fibres, yarns, monofilaments, films and so forth by casting, moulding or extruding.

The new water-insoluble quaternated dyestuffs or dyestuff salts are suitable for dyeing and printing a very wide variety of synthetic fibres, for example, polyvinyl chloride, polyamide, polyurethane and especially polyacrylic fibres.

The following examples illustrate the invention, the parts and percentages being by weight, unless otherwise stated.

EXAMPLE 1

2.54 parts of 2-amino-6-phenylazobenzthiazole are dissolved at 50° C. in 30 parts of 85% phosphoric acid, the solution is cooled to −10° C. to −15° C. and then 0.69 part of sodium nitrite is strewn in. The batch is stirred for 3 hours at −10° C., the diazonium compound is run at 0° C. into a prepared solution of 2.43 parts of N-cyanoethoxyethyl-N-cyanoethylaniline (dissolved in 50 parts of alcohol), and the batch is stirred for 1 hour at 0° C. 250 parts of ice are added, the dyestuff that precipitates is isolated by filtration and washed until free from acid. The residue is suspended in 20 parts of alcohol, the suspension is refluxed for one hour, filtered, and the filter residue is dried. The dyestuff of the formula

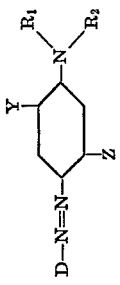

is obtained in a good yield. It dyes polyester fibres a red shade possessing good properties of fastness.

The 2-amino-6-phenylazobenzthiazole specified above is prepared by the thiocyanation of para-aminoazobenzene with ammonium thiocyanate in glacial acetic acid and subsequent cyclization by the action of bromine to form the benzthiazole.

The dyestuffs of the formula

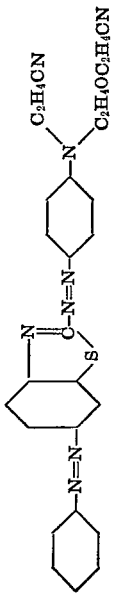

given in Table I below are obtainable by diazotization and coupling in accordance with the procedure described in this example. The shades indicated are obtainable on polyester fibres by both dyeing and printing.

TABLE I

| | D | Y | Z | $R_1$ | $R_2$ | Shade |
|---|---|---|---|---|---|---|
| 1 | 2-amino-6-phenylazobenzthiazole | —H | —NHCOOCH$_3$ | —C$_2$H$_4$CN | —C$_2$H$_4$OCH$_3$ | Violet. |
| 2 | do | —H | —H | —C$_2$H$_4$OC$_2$H$_4$CN | —C$_2$H$_4$OCH$_3$ | Do. |
| 3 | do | —OCH$_3$ | —NHCOCH$_2$CH$_3$ | —C$_2$H$_4$CN | —C$_2$H$_4$CN | Red. |
| 4 | do | —CH$_3$ | —NHCOOCH$_3$ | —C$_2$H$_4$OCOCH$_3$ | —C$_2$H$_4$OCOCH$_3$ | Blue. |
| 5 | do | | | —H | —C$_2$H$_4$OH | Violet. |
| 6 | (O$_2$N-benzthiazole) | —H | —NHSO$_2$- | —H | —H | Do. |
| 7 | Same as above | —H | —NHCONH- | —H | —H | Do. |
| 8 | do | —H | —NHCOCH$_3$ | —C$_2$H$_4$CN | —C$_2$H$_4$CN | Bluish red. |
| 9 | do | —OCH$_3$ | —O- | —H | —C$_2$H$_4$CN | Violet. |
| 10 | (O$_2$N-Cl-benzthiazole) | —H | —O-Cl | —H | —C$_2$H$_4$CN | Ruby. |
| 11 | Same as above | —OCH$_3$ | —S- | —C$_2$H$_4$OCOCH$_3$ | —C$_2$H$_4$OCOCH$_3$ | Violet. |
| 12 | do | —OCH$_3$ | —H | —H | —C$_2$H$_4$CN | Ruby. |
| 13 | (CN-benzthiazole) | —OCH$_3$ | —H | —H | —C$_2$H$_4$CN | Bluish red. |
| 14 | Same as above | —OCH$_3$ | —NHCOCH$_3$ | —H | —H | Violet. |
| 15 | do | —OC$_2$H$_5$ | | —C$_2$H$_4$OCOOC$_2$H$_5$ | —C$_2$H$_4$OCOOC$_2$H$_5$ | Reddish blue. |

TABLE I—Continued

| | D | Y | Z | R₁ | R₂ | Shade |
|---|---|---|---|---|---|---|
| 16 | | —H | —CH₃ | —C₂H₄OCH₃ | —C₂H₄OCH₃ | Red. |
| 17 | Same as above | —OCH₃ | (phenyl)—NHCOCH₂CH₃ | —C₂H₄OCOC₃H₇ | —C₂H₄OCOC₃H₇ | Violet. |
| 18 | (chloro-methyl-phenyl-azo structure) | OCH₃ | —NHCOCH₂CH₃ | —CH₃ | —CH₃ | Red. |
| 19 | Same as above | —H | —NHCOCH=CH—(phenyl) | —H | —C₂H₄CN | Red. |
| 20 | (methyl-phenyl-azo structure with CH₃) | —H | —Cl | —C₂H₄CN | —C₂H₄OC₂H₄CN | Red. |
| 21 | Same as above | —H | —Br | —C₂H₄CN | —C₂H₄CN | Red. |
| 22 | (Br-phenyl-azo structure) | —OCH₃ | —CF₃ | —C₂H₄OCOCH₃ | —C₂H₄OCOCH₃ | Red. |
| 23 | Same as above | —H | —N(COCH₂CH(CH₃)₂)(C₂H₅) | —CH₃ | —CH₃ | Violet. |
| 24 | (C₄H₉O-phenyl-N=N- structure) | —OCH₃ | —CH₃ | —CH₃ | —C₂H₄OC₂H₄CN | Do. |
| 25 | Same as above | —H | —NHCOCH₃ | —C₄H₉ | —C₂H₄OCH₃ | Do. |
| 26 | do | —H | —H | —C₂H₄CN | —CH₂—(phenyl) | Red. |
| 27 | do | —H | —H | —C₂H₄CN | —CH₂CH₂—(phenyl) | Red. |

TABLE I—Continued

| | Z | Y | R₁ | R₂ | Shade |
|---|---|---|---|---|---|
| 28 | —H | —H | —C₂H₄OCH₃ | —CH₃ | Bluish red. |
| 29 | —H | —H | —C₂H₄CN | —C₂H₄O—CH₃ | Do. |
| 30 | —H | —H | —C₂H₄COCH₃ | —CH₃ | Ruby. |
| 31 | —H | —H | —C₂H₄NHCO— | —C₂H₄CN | Red. |
| 32 | —H | | | —C₂H₄Cl | Red. |
| 33 | —CH₃ | | | —C₂H₄COOCH₃ | Red. |
| 34 | —CH₃ | | | —C₂H₄COOH | Red. |

(D column contains structural formulas)

Dyeing procedure 1 part of the dyestuff obtained in accordance with Example 1 is ground wet with 2 parts of a 50% aqueous solution of the sodium salt of dinaphthylmethanedisulphonic acid and the batch is dried.

The dyestuff preparation so obtained is mixed with 40 parts of a 10% aqueous solution of the sodium salt of N-benzyl-μ-heptadecylbenzimidazoledisulphonic acid and then 4 parts of a 40% acetic acid solution are added. A dyebath of 4,000 parts is prepared therefrom by dilution with water.

100 parts of cleaned polyester fibre material are entered into the bath at 50° C., the temperature is raised to 120 to 130° C. within half an hour, and dyeing is carried out for one hour at that temperature in a closed vessel. The material is then well rinsed. A strong red dyeing possessing excellent fastness to light and sublimation is obtained.

EXAMPLE 2

3.34 parts of 2-amino-6-(2'-chloro-4'-nitrophenylazo)-benzthiazole are dissolved at 50° C. in 70 parts of 85% phosphoric acid, the solution is cooled to −10° to −15° C., and then 0.69 part of sodium nitrite is strewn in. The batch is stirred for 3 hours at −10° C., the diazonium compound is run into a prepared solution of 1.3 parts of 2-methylindole (dissolved in 150 parts of methanol) at 0° C. and the batch is stirred for 1 hour at 0° C. 250 parts of ice are then added, the dyestuff that precipitates is isolated by filtration and then washed until free from acid. The dyestuff of the formula (structural formula)

is obtained in a good yield. It dyes polyester fibres, cellulose acetate fibres and polyamide fibres a scarlet shade possessing good properties of fastness.

The 2 - amino - 6-(2'-chloro-4'-nitrophenylazo)-benzthiazole specified above is prepared by thiocyanation of 4 - amino - 2'-chloro-4'-nitroazobenzene with ammonium thiocyanate in glacial acetic acid and subsequent cyclization by the action of bromine to form the benzthiazole.

The amines listed in column I of the following table are diazotized in accordance with the above example and coupled with the coupling components listed in column II. Dyestuffs are obtained that yield on polyester fibres the shades listed in column III.

TABLE II

| | I | II | III |
|---|---|---|---|
| 1 | 2-amino-6-phenylazobenz-thiazole. | 2-phenylindole. | Orange. |
| 2 | 2-amino-3-methyl-6-(2'-methylphenylazo)-benzthiazole. | 1,2-dimethylindole. | Do. |
| 3 | 2-amino-3-methoxy-6-phenylazobenzthiazole. | 1-methyl-2-phenylindole. | Do. |
| 4 | 2-amino-6-phenylazobenzthiazole. | 2,5-dimethylindole. | Do. |
| 5 | do. | 2-methyl-5-chloroindole. | Do. |
| 6 | do. | 2-methyl-5-fluoroindole. | Do. |
| 7 | do. | 2-methyl-7-chloroindole. | Do. |
| 8 | do. | 2-methyl-5-bromoindole. | Do. |
| 9 | do. | 2,5-dimethylindole. | Do. |
| 10 | do. | N,β-cyanoethyl-1,2,3-4,4-tetrahydroquinoline. | Do. |
| 11 | do. | Nβ,-hydroxyethyl-2,2,4-trimethyl-1,2,3,4-tetrahydroquinoline. | Do. |
| 12 | do. | N,β-γ-dihydroxypropyl-5-acetylbenzomorpholine. | Do. |

EXAMPLE 3

2.9 parts of 2-amino-6-(4'-nitrophenylazo)-benzthiazole are dissolved at 50° C. in 70 parts of 85% phosphoric acid, the solution is cooled to −10° to −15° C., and then 0.69 part of sodium nitrite is strewn in. The batch is stirred for 5 hours at −10° C., the diazonium compound is run at 0° C. into a prepared solution of 5.0 parts of 3 - dibromopropionylamino-N,N-diacetoxyethylaniline (dissolved in 130 parts of methanol) and the batch is stirred for 1 hour at 0° C. 250 parts of ice are then added, the batch is stirred for a further 60 minutes, the dyestuff that precipitates is isolated by filtration and then washed until free from acid. The dyestuff of the formula

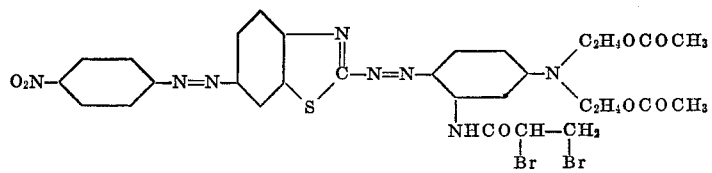

is obtained in a good yield. It dyes polyester fibres, cellulose acetate fibres and polyamide fibres a bluish red shade possessing good properties of fastness.

The 2 - amino - 6 - (4'-nitrophenylazo)-benzthiazole specified above is obtained by thiocyanation of 4-amino-4'-nitroazo-benzene with ammonium thiocyanate in glacial acetic acid and subsequent cyclization by the action of bromine to form the benzthiazole.

The dyestuffs listed in the following table of the formula

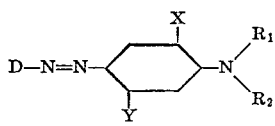

are obtained by diazotization and coupling in accordance with the procedure described in this example. The shades indicated in the last column are obtainable on polyester fibres, cellulose acetate fibres and polyamide fibres by both dyeing and printing.

80% acetic acid and 2 parts of a 5% aqueous dispersion of the compound obtained in accordance with Example 3 in 400 parts by volume of water and having a pH of 4 to 5. The bath is heated to boiling temperature in the course of 45 minutes and dyeing is carried out for 30 minutes at the boil. The pH is then adjusted to 12 by the addition of sodium carbonate and boiling is continued for a further 30 minutes. The textile material is then well rinsed with water and dried. A brilliant bluish red dyeing containing a high proportion of non-extractable dyestuff is obtained.

The dyestuff dispersion used is obtained by grinding 20 parts of dyestuff with 140 parts of water and 40 parts of the sodium salt of dinaphthylmethane-disulphonic acid.

EXAMPLE 4

4.08 parts of 2-amino-6-(4'-N-cyanoethyl-N-acetoxy-ethylaminophenylazo)-benzthiazole (prepared by monodiazotization of 2,6-diaminobenzthiazole in dilute hydrochloric acid and coupling with N-cyanoethyl-N-ethoxyethylaniline) are dissolved at 50° C. in 30 parts of 85% phosphoric acid, the solution is cooled to −10 to −15° C. and then 0.69 part of sodium nitrite is strewn in. The batch is stirred for 3 hours at −10° C., the diazonium compound is run at 0° C. into a prepared solution of

TABLE III

| | D | X | Y | $R_1$ | $R_2$ | Shade |
|---|---|---|---|---|---|---|
| 1 | 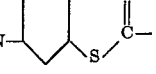 | —H | —NHCOCH$_2$Cl | —C$_2$H$_4$OCOCH$_3$ | —C$_2$H$_4$OCOCH$_3$ | Violet. |
| 2 | Same as above | —H |  | —C$_2$H$_4$CN | —C$_2$H$_4$CN | Bluish red. |
| 3 |  | —H | —NH-COCH=CH-CH-CH$_2$ <br> F$_2$C—CF$_2$ | —C$_2$H$_4$OCOCH$_3$ | —C$_2$H$_4$OCOCH$_3$ | Violet. |
| 4 | Same as above | —H | 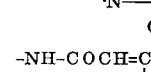 | —C$_2$H$_4$OCH$_3$ | —C$_2$H$_4$OCH$_3$ | Do. |
| 5 |  | —H | —H | —C$_2$H$_5$ | 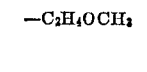 | Red. |
| 6 | Same as above | —H | —H | —C$_2$H$_5$ | 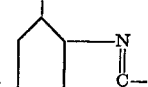 | Red. |

Example of dyeing procedure 10 parts of a knitted nylon 6.6 fabric ("Helanca") are entered at 30° C. into a dyebath containing 0.2 part of 1.74 parts of 1-phenyl-3-methyl-5-pyrazolone (dissolved in 200 parts of alcohol) and the batch is stirred for 1 hour at 0° C. 250 parts of ice are then added, the batch is stirred for a further 60 minutes, the dyestuff that precipitates is isolated by filtration and then washed until free from acid. The dyestuff of the formula

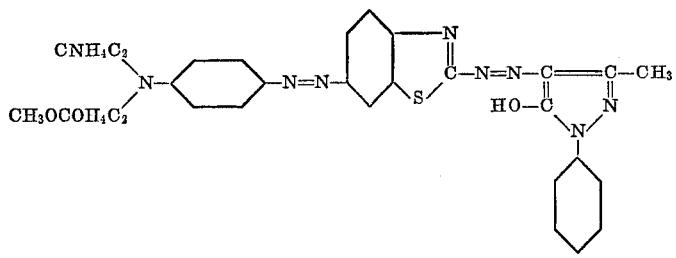

is obtained in a good yield. It dyes polyester fibres, cellulose acetate fibres and polyamide fibres a scarlet shade possessing good properties of fastness.

EXAMPLE 5

3.2 parts of 2-amino-6-(2'-hydroxynaphthylazo)-benzthiazole (prepared by monodiazotization of 2,6-diaminobenzthiazole in dilute hydrochloric acid and coupling with β-naphthol) are dissolved at 50° C. in 30 parts of 85% phosphoric acid, the solution is cooled to −10 to −15° C., and then 0.69 part of sodium nitrite is strewn in. The batch is stirred for 3 hours at −10° C., the diazonium compound is run at 0° C. into a prepared solution of 2.43 parts of N-cyanoethoxyethyl-N-cyanoethylaniline (dissolved in 50 parts of alcohol) and the batch is stirred for 1 hour at 0° C. 250 parts of ice are added, the batch is stirred for a further 60 minutes, the dyestuff that precipitates is isolated by filtration and washed until free from acid. The dyestuff of the formula

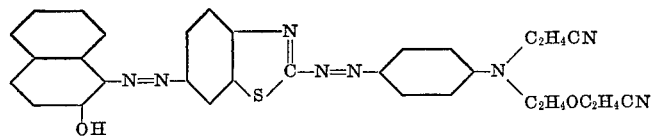

is obtained in a good yield. It dies polyester fibres, cellulose acetate fibres and synthetic polyamide fibres a red shade possessing good properties of fastness.

EXAMPLE 6

2.94 parts of 2-amino-6-(2'-methylindolylazo)-benzthiazole (prepared by monodiazotization of 2,6-diaminobenzthiazole in dilute hydrochloric acid and coupling with 2-methylindole) are dissolved at 50° C. in 30 parts of 85% phosphoric acid, the solution is cooled to −10 to −15° C., and then 0.69 part of sodium nitrite is strewn in. The batch is stirred for 3 hours at −10° C., the diazonium compound is run at 0° C. into a prepared solution of 2.43 parts of N-cyanoethoxyethyl-N-cyanoethylaniline (dissolved in 50 parts of alcohol) and the batch is stirred for 1 hour at 0° C. 250 parts of ice are then added, the batch is stirred for a further 60 minutes, the dyestuff that precipitates is isolated by filtration and washed until free from acid. The dyestuff of the formula

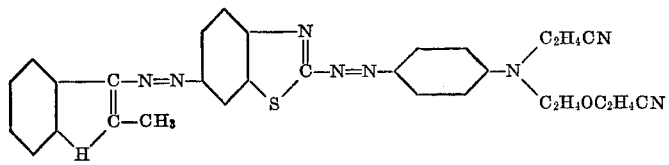

is obtained in a good yield. It dyes polyester fibres, cellulose acetate fibres and synthetic polyamide fibres a scarlet shade possessing good properties of fastness.

EXAMPLE 7

20.7 parts of 2-amino-6-acetylaminobenzthiazole are diabotized in a mixture of formic acid and concentrated sulphuric acid with sodium nitrite. The diazonium salt that is formed thereby is coupled with 16.5 parts of N-ethyl-N-ethoxyaniline dissolved in glacial acetic acid. Working up produces 26.5 parts of 2-(para-N-ethyl-N-ethoxyamino)-phenylazo-6-acetylaminobenzthiazole.

19.2 parts of this compound together with 1,000 parts of 2 N sulphuric acid are refluxed for one hour, the solution obtained is vacuum filtered, and the pH of the filtrate is adjusted to 4 to 5 with concentrated sodium hydroxide solution while cooling. The compound that precipitates thereby is isolated by filtration, washed with water and dried. 10.0 parts of 6-amino-2-(para-N-ethyl-N-ethoxyaminophenylazo)-benzthiazole are obtained.

3.4 parts of this compound are diazotized in a manner known per se with sodium nitrite in dilute hydrochloric acid, and the diazonium salt thus formed is coupled with 1.65 parts of N-ethyl-N-ethoxyaniline in hydrochloric acid solution. The addition of sodium acetate to establish a pH of 4 to 5 brings about the isolation of 4.3 parts of 2,6 - bis - (para-N-ethyl-N-ethoxyaminophenylazo)-benzthiazole, a dyestuff that dyes polyester fibres a reddish brown shade possessing good general properties of fastness when applied according the high-temperature process.

2.6 parts of 2,6 - bis - (para - N - ethyl-N-ethoxyaminophenylazo)-benzthiazole are quaternated with dimethyl sulphate in dimethyl-formamide at a temperature of 100 to 110° C. After quaternation, the course of which is followed by thin-layer chromatography, the solvent is distilled under reduced pressure, the residue is dissolved in hot water, and the dyestuff salt is precipitated from the filtered solution by the addition of sodium chloride and ZnCl₂. The dyestuff of the formula

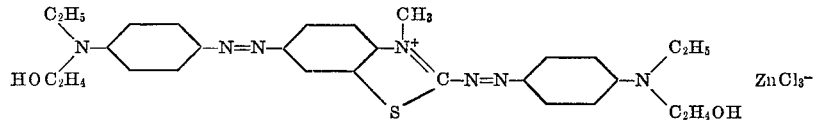

dyes polyacrylonitrile fibres a reddish blue shade possessing good properties of fastness.

The following table shows a number of dyestuffs prepared in an analogous manner and indicates the shades they produce on polyacrylonitrile fibres.

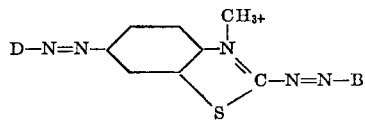

TABLE IV

| | D | B | Shade |
|---|---|---|---|
| 1 | $C_2H_5$, $C_2H_5$, $N$-phenyl | $C_2H_4OH$, $C_2H_5$, $N$-phenyl | Reddish blue. |
| 2 | morpholino-phenyl | Same as above | Do. |
| 3 | $C_2H_5$, $\overset{+}{N}C_2H_4$, pyridinium-phenyl | ----do---- | Blue. |
| 4 | $CH_3-\overset{+}{\underset{CH_3}{N}}-CH_2-\underset{OCOCH_3}{HC}-CH_2$, with $C_2H_5$-N-phenyl | ----do---- | Do. |

EXAMPLE 8

20.7 parts of 2-amino-6-acetylaminobenzthiazole are diazotized in a manner known per se with sodium nitrite in a mixture of formic acid and concentrated sulphuric acid, and the diazonium salt obtained thereby is coupled with 16.3 parts of N-phenylmorpholine dissolved in glacial acetic acid. Working up yields 33.4 parts of 6-acetylamino-2-(para-N-morpholinophenylazo)-benzthiazole.

19.0 parts of this compound together with 500 parts of ethanolic sodium hydroxide solution (prepared from 2 parts of metallic sodium, 95 parts of ethanol and 5 parts of water) are refluxed for 16 hours. The mixture is then evaporated to dryness and the powdery residue is pasted with water, vacuum filtered, the filter residue is washed with water until the washings run neutral and then dried. 9.4 parts of 6 - amino-2-(para-N-morpholinophenylazo)-benzthiazole are obtained.

3.4 parts of this compound are diazotized in a manner known per se with sodium nitrite in dilute hydrochloric acid, and the diazonium salt that is formed thereby is coupled with 1.65 parts of N-phenylmorpholine in hydrochloric acid solution. The addition of sodium acetate to establish a pH of 4 to 5 effects the isolation of 2,6-bis-(para-N-morpholinophenylazo)-benzthiazole, a dyestuff that dyes polyester fibres a reddish brown shade.

2.6 parts of 2,6-bis(para - N - morpholinophenylazo)-benzthiazole are quaternated with dimethyl sulphate in dimethylformamide at a temperature of 100 to 110° C. After quaternation, the course of which can be followed by thin-layer chromatography, the solution is distilled under negative pressure and the residue is dissolved in hot water; the dyestuff salt is precipitated from the filtered solution by the addition of NaCl and $ZnCl_2$. The dyestuff of the formula

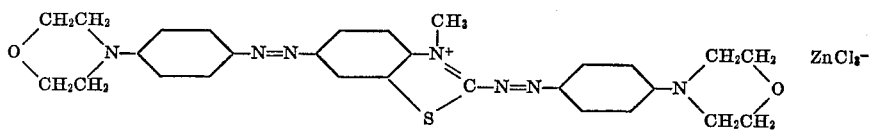

dyes polyacrylonitrile fibres a reddish blue shade possessing good properties of fastness.

The following table lists a number of dyestuffs that can be prepared in an analogous manner. The shades they produce on polyacrylonitrile fibres are also indicated.

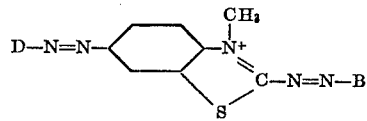

TABLE V

| | D | B | Shade |
|---|---|---|---|
| 1 | $HOC_2H_4$, $HOC_2H_4$, $N$-phenyl | morpholino-phenyl | Reddish blue. |
| 2 | $HOC_2H_4$, $HOC_2H_4$, $N$-(methylphenyl) | Same as above | Do. |
| 3 | phenyl-NH-phenyl | phenyl-NH-phenyl | Do. |
| 4 | $C_2H_5$, $C_2H_5$, $N$-phenyl | $C_2H_5$, $C_2H_5$, $N$-phenyl | Do. |

TABLE V—Continued

| | D | B | Shade |
|---|---|---|---|
| 5 | 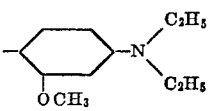 | Same as above | Do. |
| 6 | 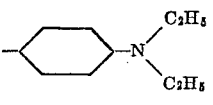 | ...do... | Do. |
| 7 | Same as above | 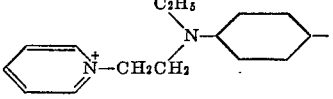 | Blue. |
| 8 | 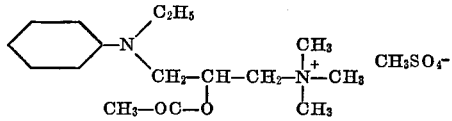 | Same as above | Do. |
| 9 | 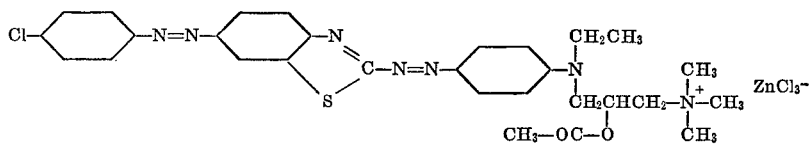 | 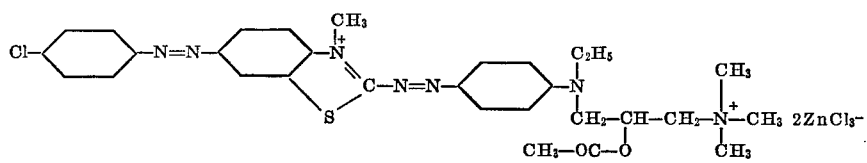 | Do. |
| 10 |  | Same as above | Do. |
| 11 |  | ...do... | Do. |

EXAMPLE 9

23.1 parts of 4-amino-4'-chloroazobenzene are dissolved with 18.7 parts of warm 95% acetic acid, the solution is cooled to 10° C., and then a solution of 20 parts of bromine in 50 parts of glacial acetic acid is added dropwise at a temperature between 10 and 15° C. The batch is stirred for 2 hours, allowed to stand overnight at room temperature, then heated to 80° C. and poured into 500 parts of hot water. The batch is filtered while hot; the filter residue is discarded, the filtrate is cooled to room temperature, and the pH is adjusted to 5 by the addition of sodium carbonate. The precipitate is isolated by vacuum filtration, washed with water and dried. 15.5 parts of 2-amino-6-(para-chlorophenylazo)-benzthiazole are obtained.

5.8 parts of this compound are dissolved at 50 to 60° C. in 10 parts of 85% phosphoric acid, the solution is cooled to −10 to −15° C., and then 1.38 parts of sodium nitrite are added. The batch is stirred for 3 hours at −10° C. and the diazonium salt solution is then run at 0° C. into a prepared solution of 7.8 parts of in 100 parts of 2 N hydrochloric acid, and the batch is stirred for 1 hour at 0° C. 250 parts of ice are then added, the batch is stirred for a further 10 minutes, the pH is adjusted to 4 with sodium acetate, and the dyestuff of the formula is precipitated by the addition of NaCl and $ZnCl_2$. It is then isolated by vacuum filtration and dried.

The dyestuff so obtained is reacted with dimethyl sulphate in dimethylformamide at a temperature of 100 to 110° C. After the reaction, the solvent is removed by distillation, the residue is dissolved in hot water, the batch is filtered and the dyestuff salt is precipitated with NaCl and $ZnCl_2$. The dyestuff so obtained of the formula dyes polyacrylonitrile fibres a greenish blue shade possessing good general properties of fastness.

The following table lists a number of dyestuffs prepared in an analogous manner, and indicates the shades they produce on polyacrylonitrile fibres.

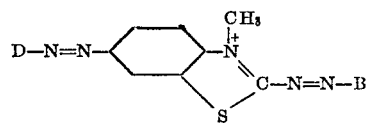

TABLE VI

| | D | B | Shade |
|---|---|---|---|
| 1 | Cl—⬡— | —⬡—N(C₂H₅)(CH₂CH₂—N⁺(pyridinium)) | Blue. |
| 2 | Same as above | —⬡—N(C₂H₅)(CH₂CH₂—N⁺(CH₃)₃) | Do. |
| 3 | O₂N—⬡— | —⬡—N(C₂H₅)(CH₂CH(OCOCH₃)CH₂—N⁺(CH₃)₃) | Bluish green. |
| 4 | Same as above | —⬡—N(C₂H₅)(CH₂CH₂—N⁺(pyridinium)) | Do. |
| 5 | CH₃O—⬡— | —⬡—N(C₂H₅)(CH₂CH(OCOCH₃)CH₂—N⁺(CH₃)₃) | Do. |
| 6 | Same as above | —⬡—N(C₂H₅)(CH₂CH₂—N⁺(pyridinium)) | Do. |
| 7 | (C₂H₅)(HOC₂H₄)N—⬡— | —⬡—N(C₂H₅)(CH₂CH(OCOCH₃)CH₂—N⁺(CH₃)₃) | Greenish blue. |
| 8 | Same as above | —⬡—N(C₂H₅)(CH₂CH₂—N⁺(pyridinium)) | Do. |
| 9 | morpholino—⬡— | —N(C₂H₅)(CH₂CH(OCOCH₃)CH₂—N⁺(CH₃)₃) | Do. |
| 10 | Cl—⬡— | —⬡—N(C₂H₄OH)(C₂H₅) | Blue. |
| 11 | O₂N—⬡— | Same as above | Bluish green. |
| 12 | CH₃O—⬡— | do | Do. |
| 13 | (C₂H₅)(HOC₂H₄)N—⬡— | do | Reddish blue. |

EXAMPLE 10

8.5 parts of 2-amino-6-(2′-methyl)-phenylazo-4-methylbenzthiazole are dissolved in 75 parts by volume of 85% phosphoric acid, the solution is cooled to —10 to —15° C. and then 2.27 parts of sodium nitrite are strewn in. The batch is stirred for 3 hours at —10 to —15° C., 2.27 parts of urea are added and stirring is continued for 15 minutes. The diazonium compound so obtained is run at 0° C. into a solution of 4.32 parts of β-naphthol in 225 parts by volume of alcohol and at the same time a 15% sodium hydroxide solution is added dropwise to keep the pH of the coupling mixture at 7 to 8. The mixture is stirred for 2 hours at 0° C., diluted with cold water, and the dyestuff that precipitates is isolated by filtration and washed until free from salt. The dyestuff so obtained, which corresponds to the formula

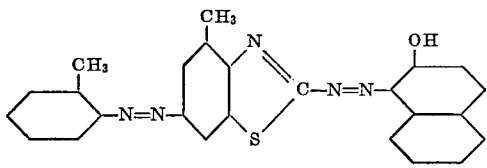

dyes nickel-modified polypropylene material a black shade possessing good properties of fastness.

The diazo component specified above is obtained by reacting 2',3-dimethyl-4-aminoazobenzene with ammonium thiocyanate in an acetic acid/propionic acid (2:1) solution and subsequently cyclizing in the presence of bromine.

Further dyestuffs that dye nickel-modified polypropylene the shades indicated in Column III of the following table can be obtained in an analogous manner by coupling the diazonium compounds of the amines listed in Column I with the coupling components given in Column II.

TABLE VII

| | I | II | III |
|---|---|---|---|
| 1 | (structure) | 1-phenyl-3-methyl-5-pyrazolone | Orange. |
| 2 | Same as above | 3-dimethylaminophenol | Reddish violet. |
| 3 | do | Dimedone | Orange. |
| 4 | do | Para-cresol | Green. |
| 5 | (structure) | 5,6,7,8-tetrahydro-2-naphthol | Olive. |
| 6 | Same as above | 3-diethylaminophenol | Reddish violet. |
| 7 | do | 2,4-dimethylphenol | Green. |
| 8 | do | Malonic acid dinitrile | Yellow. |
| 9 | do | Indoxyl | Orange. |
| 10 | do | 1,3-dimethyl-5-pyrazolone | Do. |
| 11 | (structure) | 3-hydroxy-4'-methyldiphenylamine | Violet. |
| 12 | Same as above | Hydroquinonemonomethylether | Olive. |
| 13 | do | 1-phenyl-2-methylpyrazolidine-3,5-dione | Golden yellow. |
| 14 | do | 1-methyl-4-hydroxy-2-quinoline | Brown. |
| 15 | (structure) | Acetylacetone | Scarlet. |
| 16 | Same as above | 5-chloro-1-naphthol | Grey. |
| 17 | do | β-Naphthol | Reddish black. |
| 18 | (structure) | 1-butyl-3-methyl-5-pyrazolone | Orange. |
| 19 | Same as above | 2-phenylnaphthylamine | Olive. |
| 20 | do | 4-cyclohexylphenol | Green. |
| 21 | (structure) | 3-ethylaminophenol | Violet. |
| 22 | Same as above | 4,5-diphenylimidazole | Scarlet. |
| 23 | do | 1-meta-toluyl-3-methyl-5-pyrazolone | Orange. |
| 24 | (structure) | 5,8-dichloro-1-naphthol | Grey. |
| 25 | Same as above | 1,3-indanedione | Scarlet. |
| 26 | do | 4,5-dianisylimidazole | Do. |

TABLE VII—Continued

| I | II | III |
|---|---|---|
| 27 ... Cl—C₆H₄—N=N—(benzothiazole)—C—NH₂ | 4-ethoxy-1-naphthol | Black. |
| 28 ... Same as above | 4-isopropylphenol | Green. |
| 29 ... do | Acetylacetone | Scarlet. |
| 30 ... do | 4-hydroxycoumarin | Orange. |
| 31 ... Br—C₆H₄—N=N—(benzothiazole)—C—NH₂ | 1-butyl-4-hydroxy-2-quinoline | Brown. |
| 32 ... Same as above | 1-isopropyl-3-methyl-5-pyrazolone | Orange. |
| 33 ... do | 1,2-diphenylpyrazolidine-3,5-dione | Golden yellow. |
| 34 ... Cl-substituted phenyl—N=N—(benzothiazole)—C—NH₂ | Acetoacetic acid anilide | Orange. |
| 35 ... Same as above | Dimedone | Do. |
| 36 ... do | 1,3-dimethylbarbituric acid | Do. |
| 37 ... do | β-Napthol | Grey. |
| 38 ... OCH₃—C₆H₄—N=N—(benzothiazole)—C—NH₂ | 1,3-indanedione | Scarlet. |
| 39 ... Same as above | 5,6,7,8-tetrahydro-2-naphthol | Olive. |
| 40 ... do | 1-phenyl-3-methyl-5-pyrazolone | Orange. |
| 41 ... C₄H₉—C₆H₄—N=N—(benzothiazole)—C—NH₂ | 4-chloro-1-naphthol | Grey. |
| 42 ... Same as above | 1-(4'-chlorophenyl)-3-methyl-5-pyrazolone | Orange. |
| 43 ... do | Para-cresol | Green. |

Printing procedure 1 part of the dyestuff obtained in the manner described in Example 10 and 1 part of 1,1'-dinaphthylmethane-2,2'-disulphonic acid are ground in a ball mill to form a fine aqueous paste having a dyestuff content of 10%. A mixture is then prepared from the following components using a high-speed stirrer:

100 parts of the paste described in the preceding paragraph
310 parts of cold water
50 parts of urea
500 parts of a 5% aqueous sodium alginate thickening
40 parts of ammonium sulphate 1,000 parts The printing paste so obtained is then used to print a nickel-containing polypropylene fabric. After printing, the fabric is dried, steamed for 30 minutes, rinsed in cold water, soaped for 20 minutes at 60° C. with a solution containing, per litre of water, 1 to 2 grams of the condensation product of 9 mols of ethylene oxide and 1 mol of nonylphenol, and then rinsed in cold water. A black print possessing very good properties of fastness is obtained.

EXAMPLE 11

20.7 parts of 2-amino-6-acetylaminobenzthiazole are diazotized with sodium nitrite in a mixture of formic acid and concentrated sulphuric acid. The diazonium salt is coupled with 20.6 parts of N-ethyl-N-γ-dimethylaminopropylaniline dissolved in dilute hydrochloric acid. Working up yields 35.0 parts of 2-(para-N-ethyl-N-γ-dimethylaminopropylaminophenylazo)-6-acetylaminobenzthiazole.

21 parts of this compound and 1,000 parts of 2 N sulphuric acid are refluxed for one hour, the solution so obtained is vacuum filtered, and the pH of the filtrate is adjusted to 4 to 5 with concentrated sodium hydroxide solution while cooling. The compound that precipitates thereby is isolated by filtration, washed with water and dried. 15.0 parts of 6-amino-2-(para-N-γ-dimethylaminopropylaminophenylazo)-benzthiazole are obtained.

3.8 parts of this compound are diazotized in known manner with sodium nitrite in dilute hydrochloric acid and the diazonium salt so obtained is coupled with 2.05 parts of N-ethyl-N-γ-dimethylaminopropylaniline in hydrochloric acid solution. The pH is adjusted to 4 to 5 with sodium acetate to isolate 5.1 parts of 2,6-bis-(para-N-ethyl - N - γ-dimethylaminopropylaminophenylazo)-benzthiazole.

3.0 parts of 2,6-bis-(para-N-ethyl-N-γ-dimethylaminopropylaminophenylazo)-benzthiazole are quaternated with dimethyl sulphate in dimethylformamide at a temperature of 100 to 110° C. After quaternation, the course of which is followed by thin-layer chromatography, the solvent is distilled under negative pressure, the residue is dissolved in hot water, and the dyestuff salt is precipitated from the filtered solution by the addition of NaCl and ZnCl₂. The dyestuff, which corresponds to the formula

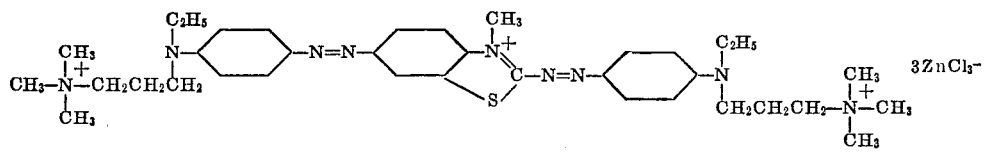

dyes polyacrylonitrile fibres a blue shade.

The following table shows a number of dyestuffs that can be prepared in an analogous manner. The shades they produce on polyacrylonitrile fibres are also indicated.

cresol, resorcinol, 1-hydroxy-3-cyanomethyl-benzene, α-naphthol, β-naphthol, 4-methoxy-1-hydroxynaphthalene, 2 - hydroxy - 8-methyl-sulphonylaminonaphthalene, 2-hydroxynaphthalene-3-carboxylic acid anilide, 2-hydroxy-8-acetylaminonaphthalene, 1-hydroxynaphthalene - 3 - sulphone - methylene - ether-4, 2-hydroxynaphthalene-6-sul-

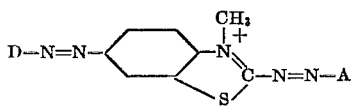

TABLE VIII

| | D | A | Shade |
|---|---|---|---|
| 1 | CH₃–N⁺(CH₃)(CH₃)–CH₂CH₂CH₂–N(C₂H₅)(CH₃)–⟨phenyl⟩– | –⟨phenyl⟩–N(C₂H₅)–CH₂CH₂CH₂–N⁺(CH₃)(CH₃)CH₃ | Blue. |
| 2 | CH₃–N⁺(CH₃)(CH₃)–CH₂CH₂CH₂–N(C₂H₅)(CH₃)–⟨phenyl-OCH₃⟩– | –⟨phenyl-OCH₃⟩–N(C₂H₅)–CH₂CH₂CH₂–N⁺(CH₃)(CH₃)CH₃ | Do. |

We claim:

1. Azo dyestuffs that are free from acidic groups imparting solubility in water and that correspond to the formula

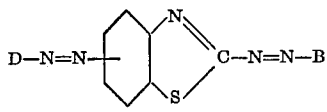

wherein B and D are each a component selected from the group consisting of a component of the formula

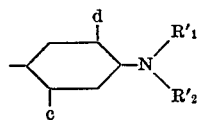

in which $d$ and $c$ are hydrogen, halogen, lower alkyl, lower alkoxy, lower alkylmercapto, phenyl, phenylmercapto, phenyloxy, cyclohexyl, cyclohexylmethyl or benzyl, $c$ can be also $C_1$–$C_8$-acylamino, wherein the acyl is unsubstituted $C_1$–$C_8$-monocarboxylic acid acyl, chlorophenoxy, $C_1$–$C_4$-alkanesulfonyl, trifluoromethyl, benzenesulfonyl, toluenesulfonyl, $C_1$–$C_4$-alkylcarbamyl, $C_1$–$C_4$-alkyloxycarbonyl, phenylaminocarbonyl, phenoxycarbonyl or aminocarbonyl; $R_1$ and $R_2$ are each hydrogen, unsubstituted alkyl of from 1 to 4 carbon atoms, or alkyl from 1 to 4 carbon atoms substituted by phenyl, halogen, $C_1$–$C_4$-alkoxy, hydroxy, cyano, cyanethoxy, $C_1$–$C_6$-hydrocarbylcarbamyloxy, $C_1$–$C_6$-hydrocarbylcarbonyloxy, $C_1$–$C_6$-hydrocarbyloxycarbonyloxy, $C_1$–$C_6$-hydrocarbylcarbonylamino, chloroacetyl, triazinylamino substituted by chlorine, $C_1$–$C_4$-alkoxy or $C_2$–$C_6$-alkoxyalkoxy, hydroxyphenoxy, nitrophenoxy, carb-$C_{1-3}$-alkoxy, nitro, β'-acetyl-ethoxycarbonyl, (β'-cyano)-ethoxycarbonyl, (β'-hydroxy)-ethoxycarbonyl, (β'-methoxy)-ethoxycarbonyl, (B'-acetoxy)-ethoxycarbonyl, carboxy, acetyl, —NH₂, trimethylamino, diethylamino or cyanoacetoxy; and a coupling component selected from the group consisting of phonamide, 2-hydroxynaphthalene-6-sulphonic acid dimethylamide, 1-hydroxy-5,8-dichloronaphthalene, N,β-dimethylaminoethyl - 2 - hydroxynaphthalene-3-carboxylic acid amide, naphthylamine, 2-phenylaminonaphthalene, 1 - dimethylaminonaphthalene, 2-ethylaminonaphthalene, indole, substituted indole wherein the substituent is selected from the group consisting of methyl, phenyl, methoxy, ethoxy, β-cyanoethyl, chloro, nitro, cyano, fluoro and bromo; pyrazole, 1-phenyl-5-aminopyrazole, pyrazolone, substituted pyrazolone wherein the substituent is selected from the group consisting of phenyl, $C_{1-4}$-alkyl, hydroxyethyl, cyanoethyl, chlorophenyl and carbomethoxy; 8-hydroxyquinoline, 1-methyl-4-hydroxyquinoline-2, N - ethyl-3-hydroxy-7-methyl-1,2,3,4-tetrahydroquinoline, barbituric acid, 1,3-indandione, 1,8-naphthindandione, dimedone, aceto-acetic acid anilide, meta-hydroxy-N,N-diethylaniline, 3-hydroxy-4'-methyldiphenylamine, hydroquinone-monomethyl ether, acetylacetone, 5-hydroxybenzthiazole, 1,2-diphenylpyrazolidine-3,5-dione, 1,2,3,4-tetrahydroquinoline, tetrahydroquinoline, N,β-cyanoethyl, N-β-β,γ-dihydroxypropyl-7-methoxy-tetrahydroquinoline, N-β-γ-dihydroxypropyl-5-acetylamino-tetrahydroquinoline, N-β-hydroxyethyl-2,2,4-trimethyl-tetrahydroquinoline, N-β-hydroxyethylbenzomorpholine and N-β,γ-dihydroxypropyl-5-acetylaminobenzomorpholine; and D may be also unsubstituted $C_6$–$C_{10}$-aryl or $C_6$–$C_{10}$-aryl substituted by hydroxy, nitro, chlorine, bromine, cyano, $C_1$–$C_2$-alkyl, $C_1$–$C_2$-alkoxy, and $C_1$–$C_2$-alkylsulfonyl.

2. Dyestuffs as claimed in claim 1 of the formula

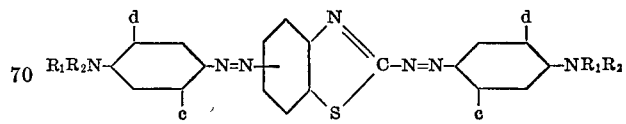

in which $d$ and $c$ are each hydrogen, halogen, lower alkyl, lower alkoxy, lower alkylmercapto, phenyl, phenylmercapto, phenyloxy, cyclohexyl, cyclohexylmethyl or benzyl, $c$ can be also $C_1$–$C_8$-acylamino, wherein the acyl is unsubstituted $C_1$–$C_8$-monocarboxylic acid acyl, chlorophenoxy, $C_1$–$C_4$-alkanesulfonyl, benzenesulfonyl, toluenesulfonyl, trifluoromethyl, $C_1$–$C_4$-alkylcarbamyl, $C_1$–$C_4$-alkyloxycarbonyl, phenylaminocarbonyl, phenoxycarbonyl or aminocarbonyl; $R_1$ and $R_2$ are each hydrogen, unsubstituted alkyl of from 1 to 4 carbon atoms, or alkyl from 1 to 4 carbon atoms substituted by phenyl, halogen, $C_1$–$C_4$-alkoxy, hydroxy, cyano, cyanethoxy, $C_1$–$C_6$-hydrocarbylcarbamyloxy, $C_1$–$C_6$-hydrocarbylcarbonyloxy, $C_1$–$C_6$-hydrocarbyloxycarbonyloxy, $C_1$–$C_6$ - hydrocarbylcarbonylamino, chloroacetyl, triazinylamino substituted by chlorine, $C_1$–$C_4$-alkoxy or $C_2$–$C_6$-alkoxy-alkoxy, hydroxyphenoxy, nitrophenoxy, carb-$C_{1-3}$-alkoxy, nitro, $\beta'$-acetylethoxycarbonyl, ($\beta'$-cyano)-ethoxy-carbonyl, ($\beta'$-hydroxy)-ethoxycarbonyl, ($\beta'$-methoxy) - ethoxycarbonyl, ($\beta'$-acetoxy)-ethoxycarbonyl, carboxy, acetyl, —$NH_2$, trimethylamino, diethylamino or cyanoacetoxy.

3. The dyestuff as claimed in claim 2 wherein the phenyl moieties are identical.

References Cited
UNITED STATES PATENTS
989,953  4/1911  Dressel et al. _____ 260—158

LEWIS GOTTS, Primary Examiner

D. M. PAPUGA, Assistant Examiner

U.S. Cl. X.R.

8—62, 173; 260—146 R, 153, 154, 155, 156, 239.9, 465 D, 465 E, 490, 556 AR, 556 B